United States Patent
Wei et al.

(10) Patent No.: US 7,505,780 B2
(45) Date of Patent: Mar. 17, 2009

(54) OUTER-LOOP POWER CONTROL FOR WIRELESS COMMUNICATION SYSTEMS

(75) Inventors: Yongbin Wei, San Diego, CA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 10/628,950

(22) Filed: Jul. 28, 2003

(65) Prior Publication Data

US 2004/0162098 A1 Aug. 19, 2004

Related U.S. Application Data

(60) Provisional application No. 60/470,770, filed on May 14, 2003, provisional application No. 60/452,790, filed on Mar. 6, 2003, provisional application No. 60/448,269, filed on Feb. 18, 2003.

(51) Int. Cl.
*H04B 7/00* (2006.01)
*H04Q 7/20* (2006.01)

(52) U.S. Cl. .................. 455/522; 455/13.4; 455/68; 455/127.1; 455/343.1; 455/422.1; 455/500; 455/574; 370/318; 370/342

(58) Field of Classification Search .................. 455/522, 455/69, 13.4, 68, 500, 507, 513, 517, 574, 455/127.1, 127.5, 343.1, 343.5, 422.1; 370/335, 370/329, 318, 342
See application file for complete search history.

(56) References Cited

U.S. PATENT DOCUMENTS 5,463,342 A 10/1995 Guard (Continued)

FOREIGN PATENT DOCUMENTS

WO 9836606 8/1998

(Continued)

OTHER PUBLICATIONS

Sarkar S et al: "cdma2000 Reverse Link: Design and System Performance", 2000 IEEE, vol. 6, pp. 2713-2719, Sep. 24, 2000.

(Continued)

*Primary Examiner*—Yuwen Pan
*Assistant Examiner*—Shaima Q Aminzay
(74) *Attorney, Agent, or Firm*—Sayed Hossain Beladi; Rupit Patel; Thomas R. Rouse (57) ABSTRACT

Systems and methods for controlling power in a wireless communication system having multiple reverse-link channels. One embodiment comprises adjusting power levels of a first set of channels and a corresponding pilot channel while maintaining a set traffic-to-pilot (T/P) ratio between them, and adjusting T/P ratios for one or more remaining channels independently of the power level of the pilot channel. A base station determines whether frames received on the first set of channels contain errors and sends messages to a mobile station to increment or decrement the power levels, respectively, if the frames do or do not contain errors. T/P ratios of the additional channels are adjusted by determining whether frames received on the additional channels contain errors, incrementing or decrementing the T/P ratios appropriately, and transmitting the T/P ratios to the mobile station, which controls the transmission parameters for the respective channels in accordance with the received T/P ratios.

41 Claims, 7 Drawing Sheets

U.S. PATENT DOCUMENTS

| | | | |
|---|---|---|---|
| 5,483,557 A | 1/1996 | Webb | |
| 5,627,938 A | 5/1997 | Johnston | |
| 5,647,366 A | 7/1997 | Weng | |
| 5,719,852 A | 2/1998 | Schilling et al. | |
| 5,764,551 A | 6/1998 | McCorkle | |
| 5,903,608 A | 5/1999 | Chun | |
| 5,991,271 A | 11/1999 | Jones et al. | |
| 6,094,459 A | 7/2000 | Kao et al. | |
| 6,111,911 A | 8/2000 | Sanderford, Jr. et al. | |
| 6,128,882 A | 10/2000 | Chow | |
| 6,130,882 A | 10/2000 | Levin | |
| 6,201,954 B1 | 3/2001 | Soliman | |
| 6,222,888 B1 | 4/2001 | Kao et al. | |
| 6,259,746 B1 | 7/2001 | Levin | |
| 6,292,515 B1 | 9/2001 | Kao et al. | |
| 6,307,844 B1* | 10/2001 | Tsunehara et al. | 370/318 |
| 6,483,816 B2* | 11/2002 | Tsunehara et al. | 370/318 |
| 6,535,723 B1* | 3/2003 | Jiang et al. | 455/245.1 |
| 6,571,104 B1* | 5/2003 | Nanda et al. | 455/522 |
| 6,609,007 B1* | 8/2003 | Eibling et al. | 455/522 |
| 6,744,754 B1* | 6/2004 | Lee | 370/342 |
| 6,952,561 B1 | 10/2005 | Kumar et al. | |
| 7,031,741 B2* | 4/2006 | Lee et al. | 455/522 |
| 7,061,986 B2 | 6/2006 | Tonissen et al. | |
| 7,092,706 B2 | 8/2006 | Yang | |
| 7,120,134 B2 | 10/2006 | Tao et al. | |
| 7,177,367 B2 | 2/2007 | Storm | |
| 7,215,930 B2 | 5/2007 | Malladi | |
| 7,257,101 B2 | 8/2007 | Petrus et al. | |
| 7,269,389 B2 | 9/2007 | Petrus et al. | |
| 7,272,199 B2 | 9/2007 | Storm et al. | |
| 7,274,743 B2 | 9/2007 | Kim | |
| 2002/0067774 A1* | 6/2002 | Razoumov et al. | 375/316 |
| 2003/0050084 A1* | 3/2003 | Damnjanovic et al. | 455/522 |
| 2003/0050086 A1* | 3/2003 | Lee et al. | 455/522 |
| 2006/0183497 A1* | 8/2006 | Paranchych et al. | 455/522 |

FOREIGN PATENT DOCUMENTS

| | | |
|---|---|---|
| WO | 0199303 A2 | 12/2001 |
| WO | 0199312 | 12/2001 |
| WO | 0201762 | 1/2002 |
| WO | 02080400 A2 | 10/2002 |

OTHER PUBLICATIONS

Sarkar S et al: "Adaptive Control of the Reverse Link in cdma2000", International Journal of Wireless Information Networks, vol. 9, No. 1, pp. 55-70, Jan. 2002.

International Search Report, PCT/US2004/004792 International Search Authority European Patent Office Nov. 8, 2004.

International Preliminary Report on Patentability PCT/US2004/004792, IPEA/US, Jun. 21, 2006.

Written Opinion PCT/US2004/004792, International Search Authority European Patent Office Aug. 18, 2005.

* cited by examiner

OUTER-LOOP POWER CONTROL FOR WIRELESS COMMUNICATION SYSTEMS

CLAIM PRIORITY UNDER 35 U.S.C. §119

The present Application for Patent claims priority to Provisional Application No. 60/448,269 entitled "Reverse Link Data Communication" filed Feb. 18, 2003; Provisional Application No. 60/452,790, entitled "Method and Apparatus for a Reverse Link Communication in a Communication System, filed Mar. 6, 2003; and Provisional Application No. 60/470,770 entitled "Outer-Loop Power Control for Rel. D" filed May 14, 2003 of which are assigned to the assignee hereof and hereby expressly incorporated by reference herein.

BACKGROUND OF THE INVENTION

1. Field of the Invention

The invention relates generally to the field of telecommunications, and more particularly to mechanisms for providing outer loop power control in a wireless communication system having multiple channels with varying channel qualities.

2. Related Art

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, wireless communication systems must deal with issues relating to power control between a base station and its mobile stations in order to maximize the performance of the system, whereas a wireline system does not.

One type of wireless communication system comprises a cellular CDMA (code division multiple access) system which is configured to support voice and data communications. This system may have multiple base stations which communicate via wireless channels with multiple mobile stations. (The base stations are also typically coupled via wireline networks to various other systems, such as a public switched telephone network.) Each base station communicates with a set of mobile stations that are within a sector corresponding to the base station. This base station is responsible for controlling power in communications between the base station and the mobile stations in order to minimize interference and maximize throughput, as well as enabling the mobile stations to conserve energy and thereby extend the amount of time during which they can be used.

Power control between the base station and a mobile station in this type of system is typically based upon an error rate associated with communications between the base station and the mobile station. Ideally, the power level of the transmissions from the mobile station to the base station is set to a level that results in a predetermined frame error rate. For example, each time a frame of data is successfully received by the base station from the mobile station, the base station may direct the mobile station to reduce its power by a certain amount. In other words, the mobile station decrements its power level. If on the other hand, a received frame of data contains errors, the base station may direct the mobile station to increase its power by a certain amount (i.e., increment its power level). In this manner, the power level of the mobile station is adjusted to a power level at which the predetermined, acceptable error rate is maintained.

This method for power control, however, is based on a single channel and does not account for the varying transmission characteristics of multiple reverse-link channels. In systems having multiple channels, the power levels of the different channels may be tied to each other so that optimizing the power level based upon the error rate associated with one channel may provide acceptable performance on that particular channel, but may at the same time provide an unsatisfactory level of performance on one or more of the other channels. While the adjustment of the power mobile may take into account the performance of multiple channels, there will almost certainly be some channels for which the power level is too low and some for which the power level is too high.

SUMMARY OF THE INVENTION

Some wireless communication systems have multiple channels that may be transmitting at the same time. Rather than performing power control based upon a composite metric and having better-than-necessary performance on some channels and unsatisfactory performance on others, it is desirable to provide satisfactory grades of service on each of the channels.

Various embodiments of the present invention attempt to improve power control in systems having multiple channels by providing some level of independent control for the different channels. More specifically, the power levels of one or more traffic channels and a pilot channel are controlled to increase or decrease in unison, so that the ratios of traffic to pilot signals for each of these channels is maintained at about the same value. Other channels are controlled by setting corresponding variable traffic to pilot ratios. The power levels of the corresponding channels are then adjusted based upon the received traffic-to-pilot ratios and the already-set pilot power level.

One embodiment comprises a method for controlling power in a wireless communication system having multiple reverse-link communication channels comprising adjusting power levels of a first set of channels and a corresponding pilot channel and adjusting traffic-to-pilot (T/P) ratios for one or more remaining channels independently of the power level of the pilot channel. In one embodiment, the first set of channels actually comprises a single channel (the "first" channel). The power levels of the first and pilot channels are adjusted in a manner that maintains a set T/P ratio for these channels. The first and pilot channels are adjusted in this embodiment by determining whether frames received on the first channel contain errors and incrementing or decrementing the power levels if the frames do or do not contain errors, respectively. In one embodiment, the power levels are actually incremented or decremented by sending messages from the base station to the mobile station, where the messages indicate that the mobile station should increment or decrement the power levels of these channels. When the mobile station receives the messages, the appropriate action is taken. In this embodiment, the T/P ratios of the additional channels are adjusted in a similar manner (i.e., by determining whether frames received on the additional channels contain errors and incrementing or decrementing the T/P ratios as appropriate). The T/P ratios, as incremented or decremented, are then transmitted to the mobile station, which controls the transmission parameters for the respective channels in accordance with the received T/P ratios.

An alternative embodiment of the invention comprises a wireless communication system having a base station and a mobile station coupled to the base station via a wireless communication link, wherein the base station receives data from the mobile station on a plurality of reverse-link channels of the wireless communication link, and wherein the base station adjusts the power levels for a first set of reverse-link channels and a pilot channel, and adjusts a traffic-to-pilot (T/P) ratio for each of one or more additional reverse-link channels. In one embodiment, the first set f channels includes only a single channel (the "first" channel) and the base station maintains a set T/P ratio for the first and pilot channels while adjusting the power levels of both of these channels. In one embodiment, the base station determines whether data received on the first channel contains errors, increments the power levels of the first and pilot channels if the data received on the first channel contains errors and decrements the power levels of these channels if the data contains no errors. In one embodiment, the base station increments or decrements the power levels by sending messages from the base station to a mobile station, indicating that the mobile station should increment or decrement the power levels appropriately. The mobile station receives the messages and takes the appropriate action. In one embodiment, the T/P ratios of the additional channels are adjusted similarly, by determining whether frames received on the additional channels contain errors and incrementing or decrementing corresponding T/P ratios maintained at the base station, as appropriate. The T/P ratios, as incremented or decremented, are then transmitted to the mobile station, which controls the transmission parameters for the respective channels in accordance with the received T/P ratios.

Numerous additional embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION OF A PREFERRED EMBODIMENT

One or more embodiments of the invention are described below. It should be noted that these and any other embodiments described below are exemplary and are intended to be illustrative of the invention rather than limiting.

As described herein, various embodiments of the invention comprise systems and methods for providing power control for multiple channels wherein an amount of independence is provided in the control of each channel.

In one embodiment, a wireless communication system provides multiple reverse-link channels for communication of data from a mobile station to a base station. With respect to a first one of the channels, the base station controls the power level of the channel to maintain an essentially constant traffic-to-pilot (T/P) ratio. In other words, the power levels of the traffic and power signals are increased or decreased proportionately. For example, if errors are received on the channel, the power levels of the traffic and pilot are incremented, whereas if no errors are received, the power levels of the traffic and pilot are decremented. With respect to the remaining channels, power control is performed by increasing or decreasing the T/P ratio, rather than the power levels of both the traffic and pilot. Thus, if errors are received on one of these channels, the corresponding T/P ratio is incremented, while the pilot power level is maintained. If, on the other hand, errors are not received on this channel, the T/P ratio is decremented while the pilot power level remains the same.

In an alternative embodiment, the wireless communication system again provides multiple reverse-link channels for communicating data from a mobile station to a base station. In this embodiment, however, the power level of the pilot is adjusted in tandem with multiple traffic channels, rather than a single channel. In this embodiment, the T/P ratios of multiple channels in a first set are essentially fixed, and the power levels of the pilot and the first set of traffic channels are adjusted upward or downward simultaneously. In one embodiment, the T/P ratios may be initially adjusted before being fixed. The power levels of these channels are adjusted based on a composite function of the errors detected in the data received on all of the channels in the first set. For example, the function may comprise the maximum up-step, plus the maximum down-step (where the down-step is considered to have a negative value), where the up-step and down-step are computed in the same manner as for a single channel. With respect to the remaining channels, the T/P ratios of the channels are adjusted in the same manner as described above. In other words, if errors are received on one of these channels, the corresponding T/P ratio is incremented, but if errors are not received on this channel, the T/P ratio is decremented.

A preferred embodiment of the invention is implemented in a wireless communication system that conforms generally to a release of the cdma2000 specification. cdma2000 is a 3rd Generation (3G) wireless communication standard that is based on the IS-95 standard. The cdma2000 standard has evolved and continues to evolve to continually support new services in a standard 1.25 MHz carrier. The preferred embodiment of the invention is intended to be operable in systems utilizing Release D of the cdma2000 standard, but other embodiments may be implemented in other Releases of cdma2000 or in systems that conform to other standards (e.g., W-CDMA). The embodiments described herein should therefore be considered exemplary, rather than limiting.

Figure 1:
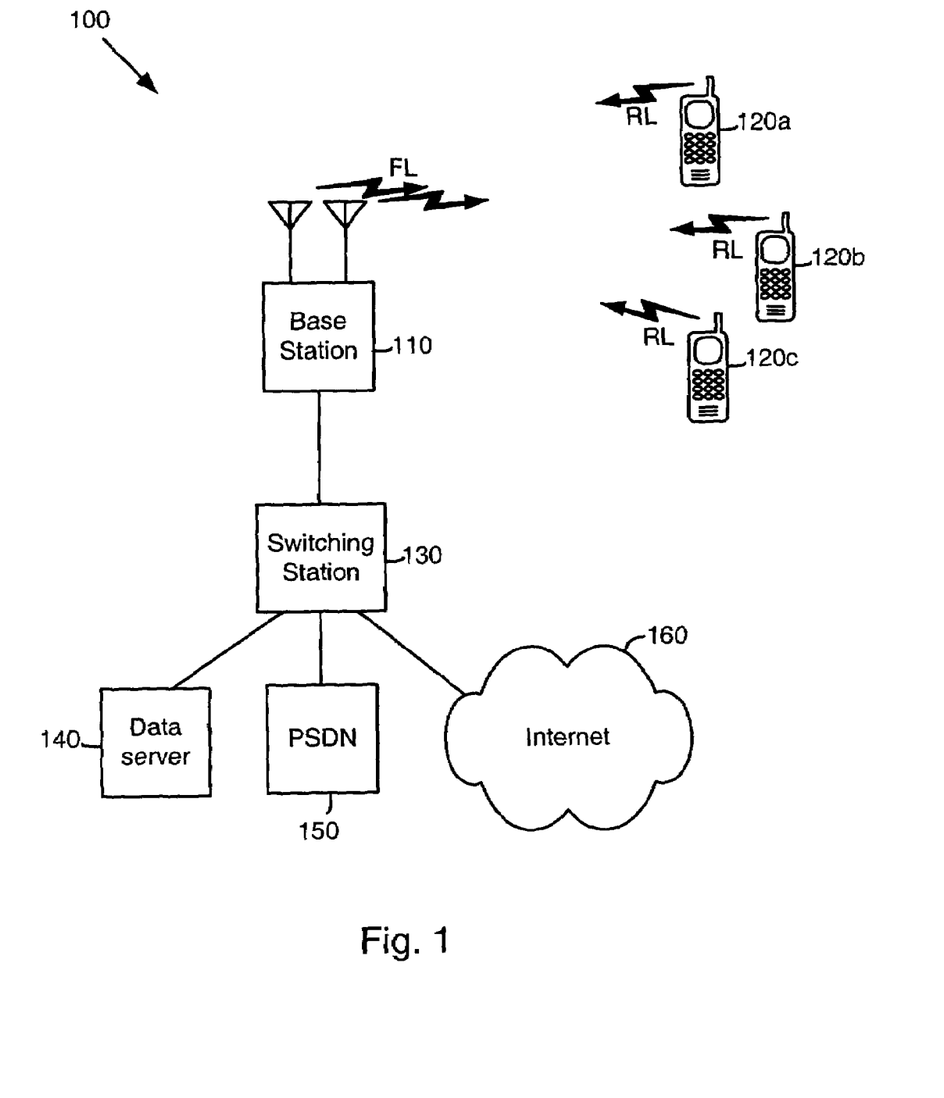
FIG. 1 is a diagram illustrating the structure of an exemplary wireless communications system in accordance with one embodiment.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs or PDA), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a switching station 130 via a wireline link. The link to switching station 130 allows base station 110 to communicate with various other system components, such as a data server 140, a public switched telephone network 150, or the Internet 160. It should be noted that the mobile stations and system components in this figure are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
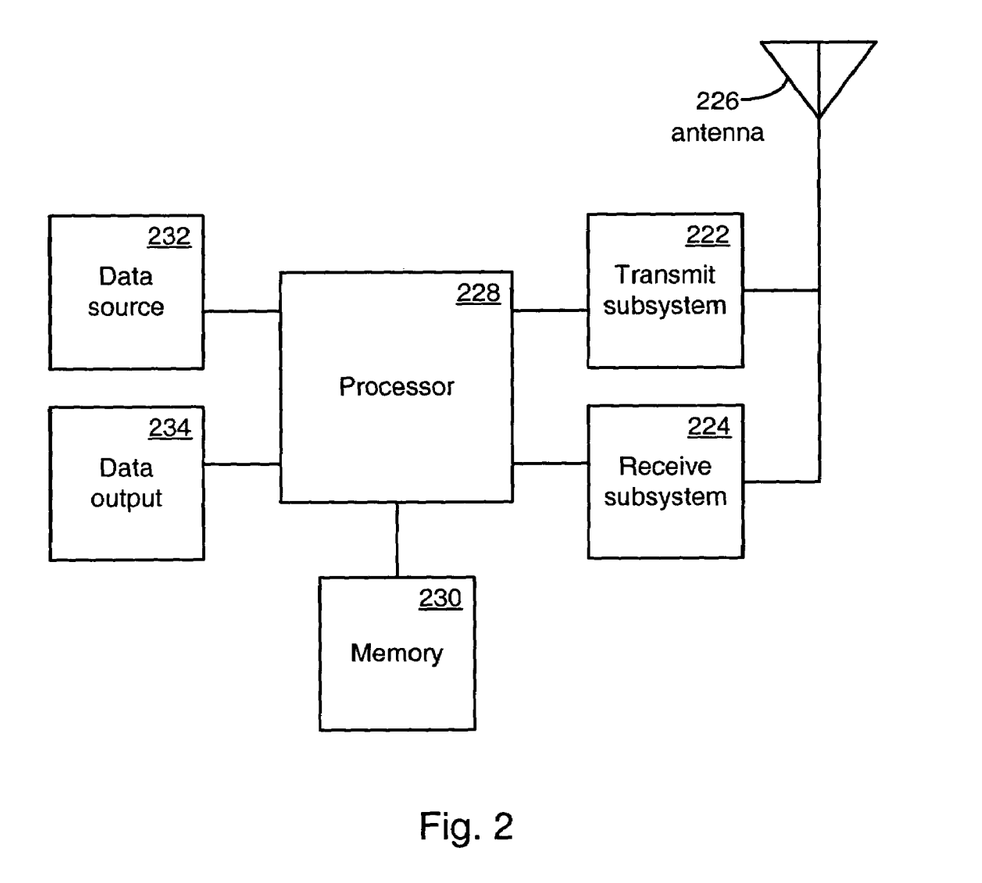
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 350, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224 and antenna 226. The processing subsystem could be considered to include processor 228, memory 230, data source 232 and data output 234.

Figure 3:
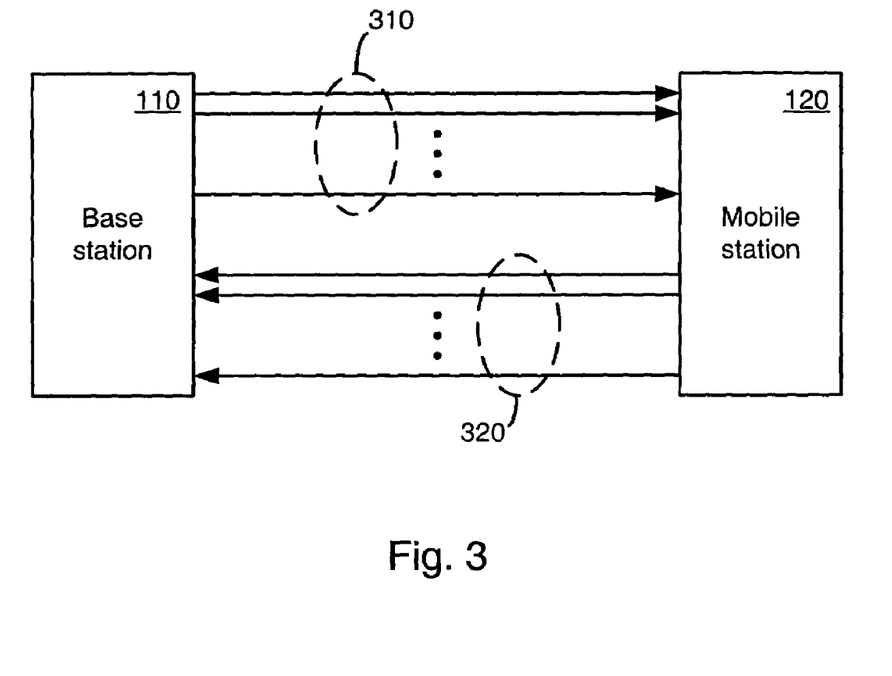
FIG. 3 is a diagram illustrating multiple channels between the mobile station and base station in accordance with one embodiment.

As indicated above, the communication link between the base station and the mobile station actually comprises various channels. Referring to FIG. 3, a diagram illustrating multiple channels between the mobile station and base station is shown. As depicted in the figure, Base station 110 transmits data to mobile station 120 via a set of forward link channels 310. These channels typically include both traffic channels, over which data is transmitted, and control channels, over which control signals are transmitted. Each of the traffic channels generally has one or more control channels associated with it. Forward link channels 310 may include, for example, a Forward Fundamental Channel (F-FCH) that may be used to transmit low-speed data, a Forward Supplemental Channel (F-SCH) that may be used for high-speed, point-to-point communications, or a Forward High-Speed Broadcast Channel (F-HSBCH) that may be used to broadcast messages to multiple recipients. The channels may also include a Forward Dedicated Control Channel (F-DCCH), a forward broadcast control channel (F-BCCH) or a Forward Paging Channel (F-PCH) that may be used to transmit control information relating to the traffic channels or to other aspects of the operation of the system.

Mobile station 120 transmits data to base station 110 via a set of reverse link channels 320. Again, these channels typically include both traffic channels and control channels. Mobile station 120 may transmit data back to the base station over such channels as a reverse access channel (R-ACH), an extended reverse access channel (R-EACH), a reverse request channel (R-REQCH), a reverse enhanced supplemental channel (R-ESCH), a reverse dedicated control channel (R-DCCH), a reverse common control channel (R-CCCH), or a reverse rate indicator channel (R-RICH).

In many instances, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resources involves several factors. One factor to consider is the mix of scheduled reverse link transmissions from the different mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, some mobile stations may be granted access at the highest rate they can support. Additional mobile stations may be granted access until capacity is reached. In deciding which mobile stations to schedule, the base station may therefore consider the maximum rate each mobile station can support and the amount of data each mobile station has to transmit. A mobile station capable of higher throughput (considering both the data rate supportable by the mobile station and the amount of data the mobile station has to transmit) may be selected instead of an alternate mobile station that cannot currently support the higher throughput.

Another factor to be considered is the quality of service required by each mobile station. It may be permissible to delay access to a particular mobile station in hopes that the mobile station's channel (or more specifically its supportable throughput) will improve, instead selecting mobile station that can support higher throughput. It may be the case, however, that a sub-optimal mobile station may need to be granted access in order to allow the mobile station to meet minimum quality of service guarantees. Therefore, the data throughput that is actually scheduled may not be the absolute maximum, but may instead be optimized in light of channel conditions, available mobile station transmit power, quality of service requirements, and similar factors.

Various scheduling mechanisms may be used to allow a mobile station to transmit data on the reverse link. One class of reverse link transmissions involves the mobile station making a request to transmit on the reverse link. The base station makes a determination of whether resources are available to accommodate the request, and a grant can be made by the base station to allow the transmission. The grant be made specifically to an individual mobile station, or it may be a common grant to al of the mobile stations. Alternatively, the mobile station may not have sufficient data or channel quality to justify a request, and may autonomously transmit data to the base station.

The base station allocates the capacity of the reverse link to one or more mobile stations. A mobile station that is granted access is allowed a maximum power level for the transmissions that will be made under the grant. In one embodiment, the reverse link capacity is allocated using a traffic-to-pilot (T/P) ratio. Since the pilot signal of each mobile station is adaptively controlled by a power control, specifying the T/P ratio indicates the available power for use in transmitting data on the reverse link. As indicated above, the base station may make specific grants to one or more mobile stations, indicating a T/P value specific to each mobile station, and may also make a common grant to the remaining mobile stations that have requested access, indicating a maximum T/P value that is allowed for the transmissions of those remaining mobile stations.

Conventionally, T/P was used for allocation of reverse link capacity to different mobile stations, without regard to the specific channels used by each of the mobile stations. In other words, power control was performed essentially on a per mobile station basis. In the present system, T/P ratios for individual channels between a particular mobile station and the base station are involved in the power control methodology, rather than simply being used for allocation between mobile stations.

Figure 4:
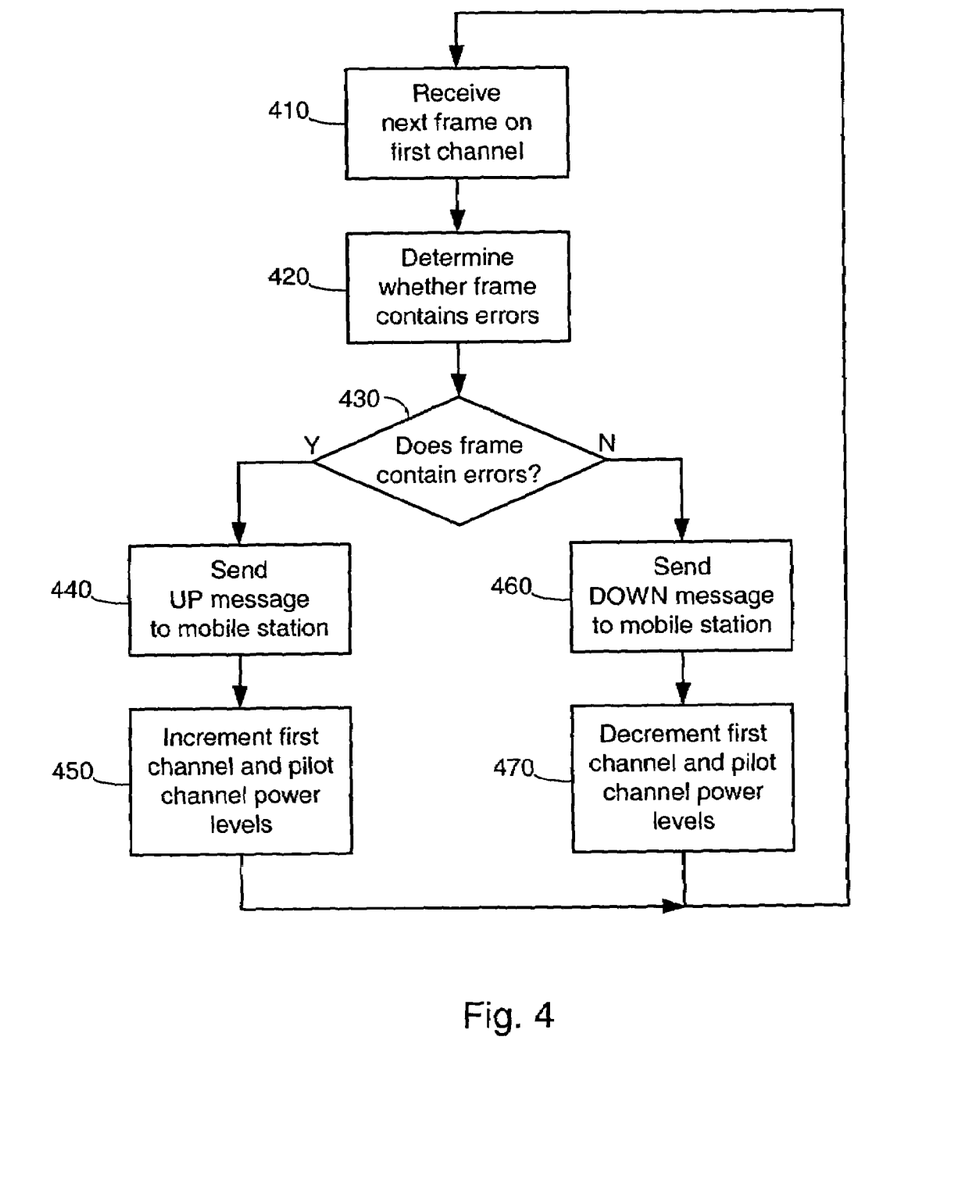
FIG. 4 is a flow diagram illustrating a method used in conjunction with a first channel, wherein the power levels of both the first channel (a traffic channel) and a pilot channel are adjusted in accordance with one embodiment.
Figure 5:
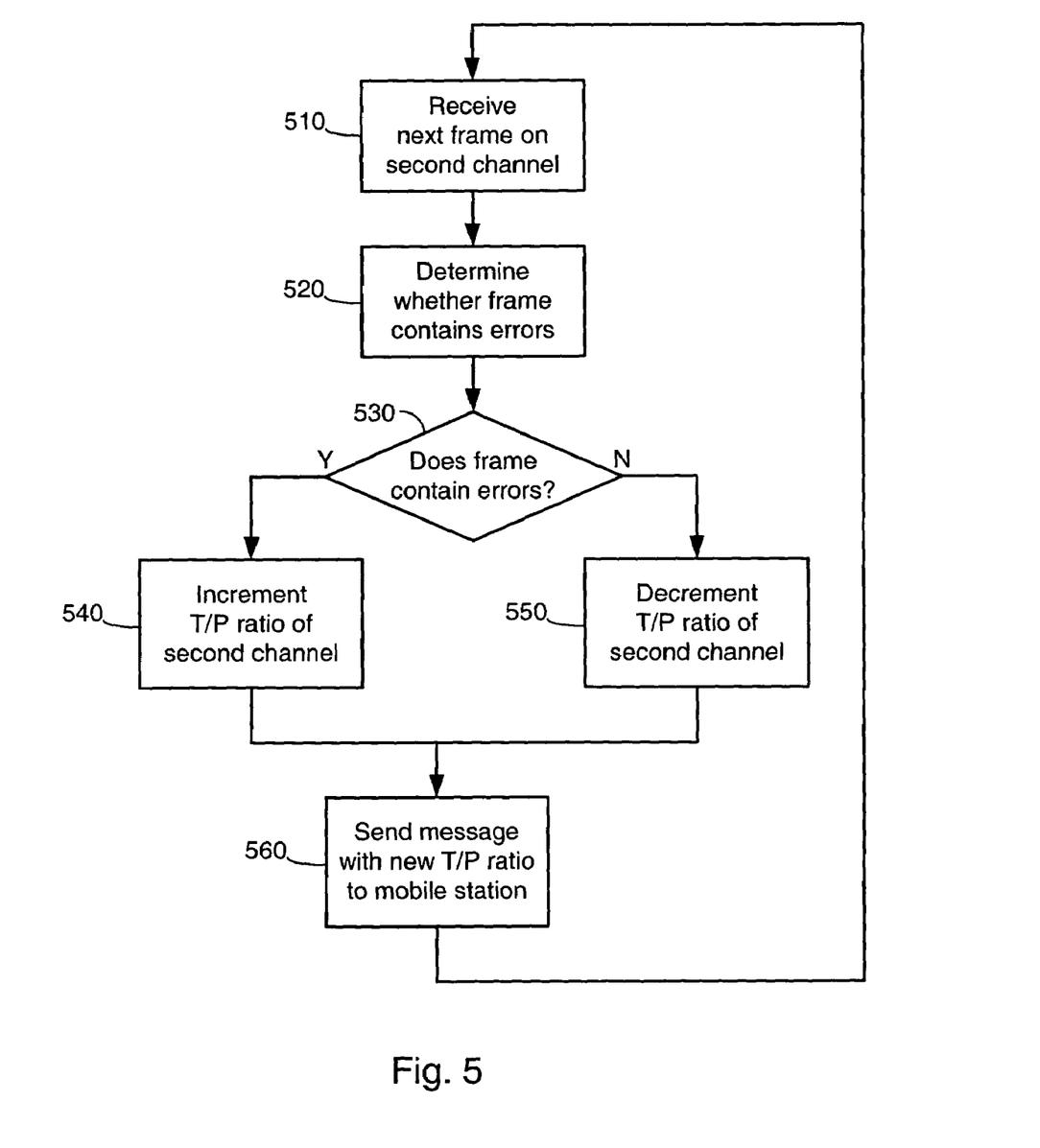
FIG. 5 is a flow diagram illustrating a method used in conjunction with a second channel, wherein rather than adjusting the power levels of both the second (traffic) and pilot channels, the T/P ratio of the second channel is adjusted in accordance with one embodiment.

Referring to FIGS. 4 and 5, flow diagrams illustrating the methods employed in one embodiment to control power onto different channels between a mobile station and a base station are shown. FIG. 4 depicts a method used in conjunction with a first channel, wherein the power levels of both the first channel (a traffic channel) and a pilot channel are adjusted. The power levels of the first and pilot channels are incremented or decremented at the same time to maintain the T/P ratio between them. FIG. 5 depicts a method used in conjunction with a second channel, wherein rather than adjusting the power levels of both the second (traffic) and pilot channels, the T/P ratio of the second channel is adjusted. Thus, the power level of the second channel is effectively adjusted without affecting the power level of the pilot channel.

In one embodiment, the first channel, for which the power level is adjusted in unison with the pilot channel, is a reverse-link fundamental channel (R-FCH). This channel carries voice communications, which are typically of primary importance in wireless communication systems (e.g., cellular phone systems). Because the level of service on this channel may be critical, using it as the basis for power control ensures that the level of service will be satisfactory, even though it may not be possible to provide satisfactory levels of service on all channels.

Referring again to FIG. 4, power control with respect to the first channel is performed by first receiving a frame of data at the base station (block 410) and determining whether the frame contains errors (block 420). If the frame contains errors (block 430), the power level of the first channel is too low, so the base station sends an UP message to the mobile station (block 440) indicating that the power level of this channel and the pilot channel should be incremented. When this message is received by the mobile station, the mobile station increments the power levels of the first channel and the pilot channel (block 450). If the frame does not contain errors (block 430), then the power level of the first channel is sufficiently high and the base station sends a DOWN message to the mobile station (block 460) indicating that the power level of this channel and the pilot channel should be decremented. When this message is received by the mobile station, the mobile station decrements the power levels of the first channel and the pilot channel (block 470).

When an error is received on one of the channels and it is necessary to send an UP or DOWN message to the mobile station, the amount by which the power levels (or T/P ratios) are incremented (the up-step) or decremented (the down-step) may vary from one implementation to another. Typically, the amount by which the power levels are incremented are substantially greater than the amount by which the power levels are decremented. In an exemplary embodiment in which the pilot is power controlled in conjunction with a single traffic channel, the up-step has a value of X dB, while the down-step has a value of $X/(1/\text{FER}-1)$, where FER is the frame error rate of the traffic channel. Similarly, the T/P ratio of each of the additional channels may be incremented by an amount Y, and decremented by an amount $Y/(1/\text{FER}-1)$, where the value of FER corresponds to the channel for which the T/P ratio is being incremented/decremented.

In embodiments in which the pilot is power controlled in conjunction with multiple traffic channels, the computation of the up-step and down-step may be a bit more complex, although this is not necessarily the case. In one exemplary embodiment, the up-step is selected as the maximum of the up-steps computed for the multiple channels. In this embodiment, the down-step is selected as the minimum of the down-steps computed for the multiple channels. In an alternative embodiment, the up-step may be selected as the minimum of the up-steps computed for the multiple channels, while the down-step is selected as the maximum of the down-steps computed for the multiple channels. In yet another embodiment, the up-step is selected as the maximum of the up-steps computed for the multiple channels, and the down-step is computed as the sum of the down-steps computed for the individual channels. In one embodiment, the final pilot adjustment is calculated as the sum of the up-step and the down-step. In another embodiment, the final pilot adjustment is further quantized to limited levels and signaled to the mobile stations. In yet another embodiment, the quantization has two levels, up or down with a fixed amount.

Referring again to FIG. 5, power control with respect to the second channel is performed by again receiving a frame of data at the base station (block 510) and determining whether the received frame contains errors (block 520). If the frame contains errors (block 530), however, the T/P ratio is incremented (block 540) by the base station, which maintains a current T/P value for each mobile station with which it communicates. A message is then sent from the base station to the mobile station indicating the new T/P value (block 560). The mobile station then sets the power level of the second channel in accordance with the new T/P. Unlike the flow diagram of FIG. 4, the pilot power level is not affected by errors that are experienced on the second channel or the resulting changes in T/P. If the frame does not contain errors (block 530), the T/P ratio is decremented (block 550), and a corresponding message is sent to the mobile station (block 560). Again, the new T/P does not affect the power level of the pilot signal.

Figure 6:
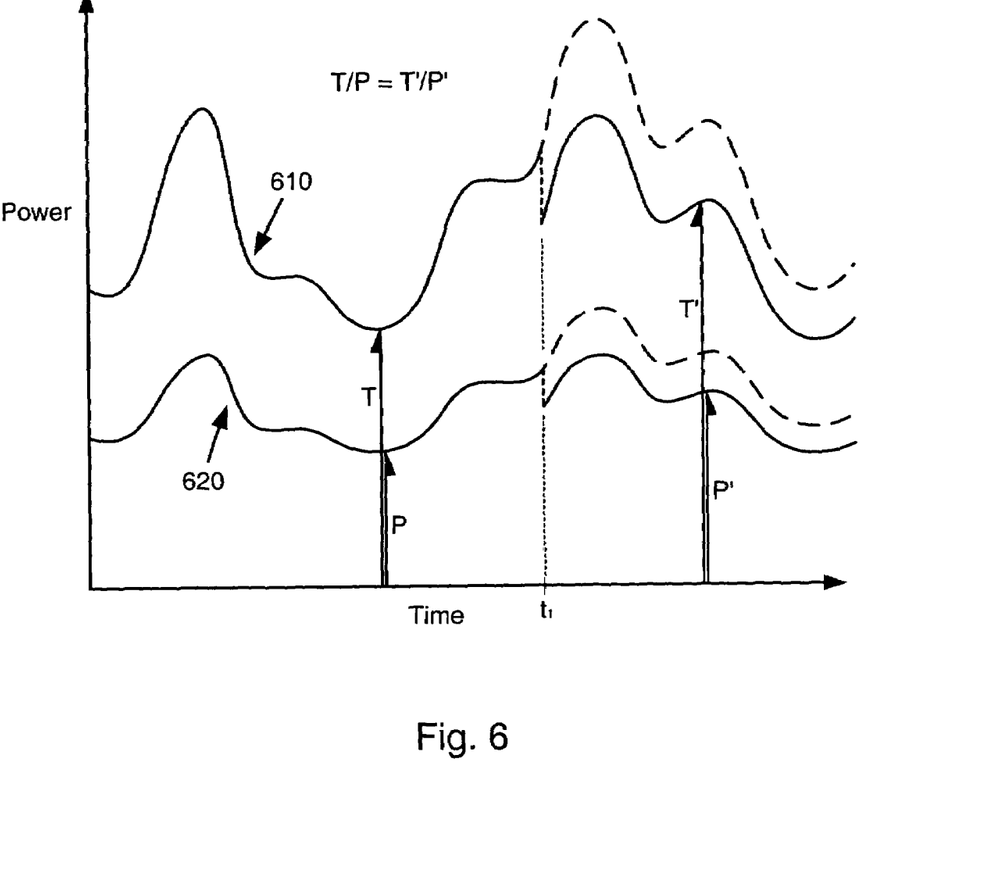
FIG. 6 is a diagram illustrating the relative power levels of a first channel and a pilot channel and their adjustment in accordance with FIG. 4.

The effect of the method depicted in FIG. 4 is illustrated in FIG. 6. FIG. 6 is a diagram illustrating the relative power levels of the first channel and the pilot channel. The diagram of FIG. 6 shows the power levels of these channels as functions of time. The power level of the first channel is indicated by reference number 610, while the power level of the pilot channel is indicated by reference number 620. It can be seen that the power level of curve 610 is proportional to power level of curve 620. The proportional if the curves (T/P) remains constant. While the power levels of the curves are decremented at time t1, the proportionality of the curves remains constant. In other words, the T/P ratio is the same, both before and after time t1 (i.e., T/P is equal to T'/P').

Figure 7:
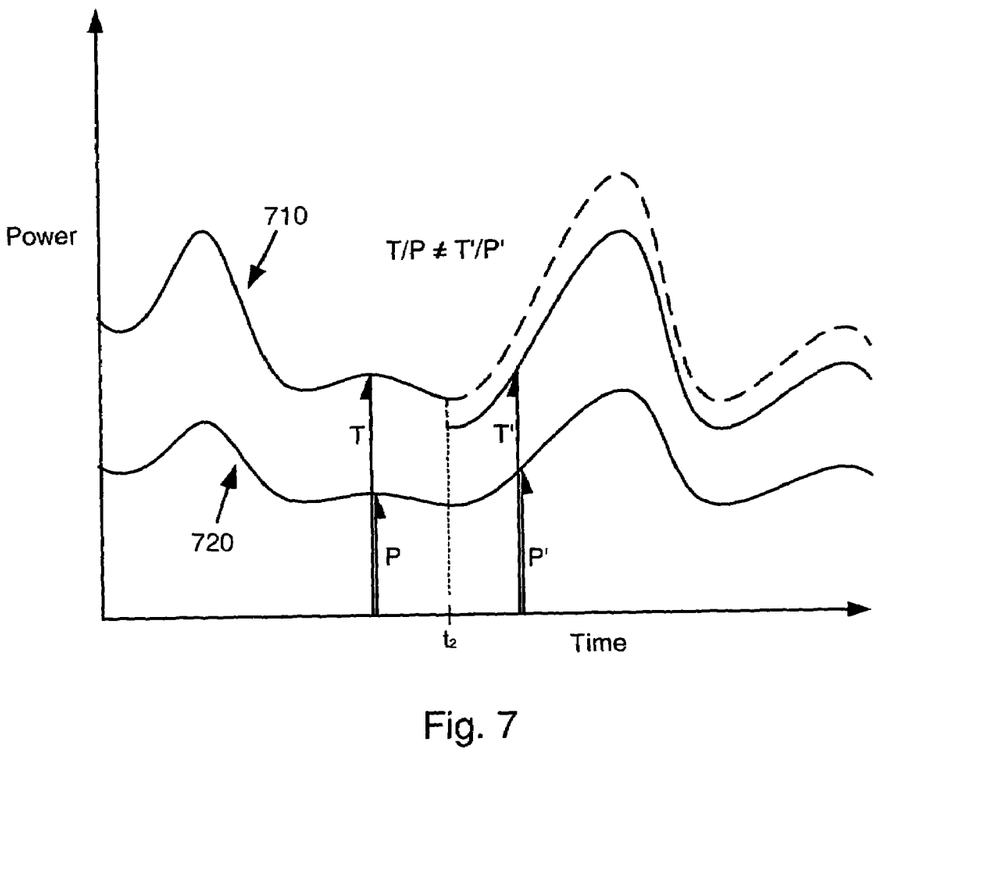
FIG. 7 is a diagram illustrating the relative power levels of a second channel and a pilot channel and their adjustment in accordance with FIG. 5.

The effect of the method depicted in FIG. 5 is illustrated in FIG. 7. This figure is a diagram illustrating the relative power levels of the second channel and the pilot channel. The 710 curve corresponding to the power level of the second channel is proportional to the curve 720 corresponding to the power level of the pilot channel, but when it is necessary to decrement the power level of the second channel (i.e., at time t2), the pilot power level is not affected. Thus, while that to curves are proportional before time t2 and after time t2, the proportionality of the curves changes (i.e., T/P is not equal to T/P).

By implementing power control in separate channels as described above, the power levels and/or T/P ratios of the channels can be optimized with a degree of independence from each other. In one embodiment, one of the channels can be optimized by simultaneously adjusting the power levels of the channel and the pilot channel, while the remainder of the channels can be optimized by adjusting their respective T/P ratios. In another embodiment, one set of channels is power-controlled simultaneously with the pilot, while another set has its T/P ratios adjusted without affecting the power levels of the pilot or the first set of channels.

Then, the mobile station can determine whether or not to transmit data on each of the channels, and select the appropriate transmit power, data rate, and other parameters for such transmissions. The mobile station's selection of transmission parameters may involve various considerations. For example, as described above, a mobile station may trade off throughput for latency in deciding whether to use autonomous transfer to transmit data. In other words, the mobile station may transmit immediately to reduce latency, or may request a higher rate transfer and waiting for a common or specific grant. In addition, given the maximum T/P with which the mobile station is allowed to transmit, the mobile station may select a data rate (that doesn't exceed the allowed T/P) to suit the latency and/or throughput requirements for the data to be transmitted.

The different mobile stations with which the base station communicates may be capable of supporting different levels of throughput. This situation may result from the fact that the mobile stations are in different locations within the cell, are traveling at different speeds, and are experiencing varying channel conditions. The throughput that can be supported by a mobile station may also be affected by the mobile station's selection of various transmission characteristics, such as transmission power, transmission rate, and modulation format. The mobile station's selection of these characteristics may be based on a number of factors. For example, the rate of transmission may be increased (by reducing code rate, increasing the symbol rate, or using a higher order modulation scheme) to increase data throughput.

Another factor is the mobile station's power. Mobile stations have a limited amount of available transmit power. Because data transmission rates are directly related to the power of the transmission, the transmission rate of a mobile station may be limited by the maximum power of the mobile station's amplifier. The amount of available mobile station transmit power can then be allocated to one or more pilot channels, one or more data channels, and any other associated control channels. To be effective, the associated pilot channel must be received reliably to provide a phase reference for the modulation. Thus, a portion of the available transmit power is allocated to the pilot, and increasing that portion will increase the reliability of pilot reception. Increasing that portion of available transmit power allocated to the pilot, however, also decreases the amount of power of available for data transmission, and decreasing that portion of available transmit power allocated to the data also decreases the modulation reliability. Nevertheless, an appropriate modulation format and transmission rate can be determined for any given T/P ratio.

Mobile station transmit power may also be governed by the base station to avoid excessive interference with other mobile stations, using power control and various data transmission scheduling techniques. Power control is used to maintain reverse link signals at levels that are suitable for the base station. The base station receives pilot signals from each of the mobile stations and controls the power levels of the mobile stations so that the pilot power received from each mobile station is approximately the same. Because the pilot level is about the same for each mobile station, the T/P ratio for a mobile station is an indicator of the amount of the communication capacity used by the mobile station during reverse link transmission. After the base station determines the T/P ratio for each mobile station, the mobile stations can then appropriately select transmission power, transmission rate, and modulation format to stay within the allowed T/P ratios.

The various aspects and features of the present invention have been described above with regard to specific embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for controlling power in a wireless communication system having multiple reverse-link communication channels, the method comprising:
   adjusting power levels of a first set of channels and a corresponding pilot channel according to a fixed ratio, the first set of channels including at least one traffic channel; and
   adjusting one or more traffic-to-pilot (T/P) ratios for one or more additional traffic channels independently of the power level of the pilot channel, the adjusting power levels and the adjusting one or more T/P ratios being performed by a single base station for a single mobile station.

2. The method as recited in claim 1, further comprising maintaining the fixed ratio of the power levels of the first set of channels and the pilot channel while adjusting the power levels of the first set of channels and the pilot channel.

3. The method as recited in claim 1, wherein the first set of channels comprises a single channel, wherein adjusting the power levels of the first set of channels and the corresponding pilot channel comprises
   determining whether data received on the single channel contains errors,
   if the data received on the single channel contains errors, incrementing the power levels of the single channel and the corresponding pilot channel, and
   if the data received on the single channel does not contain errors, decrementing the power levels of the single channel and the corresponding pilot channel.

4. The method as recited in claim 3, wherein determining whether the data received on the single channel contains errors is performed by the base station, wherein the method further comprises the base station sending a message to the mobile station to increment or decrement the power levels of the single channel and the corresponding pilot channel.

5. The method as recited in claim 4, wherein incrementing the power levels of the single channel and the corresponding pilot channel is performed by the mobile station in response to the message.

6. The method as recited in claim 3, wherein the single channel comprises a voice channel.

7. The method as recited in claim 1, wherein the first set of channels comprises multiple channels, wherein adjusting the power levels of the first set of channels and the corresponding pilot channel comprises
   determining for each channel in the first set whether data received on the channel contains errors and
   determining a composite adjustment of the power levels of the first set of channels and the corresponding pilot channel based on errors received on the multiple channels.

8. The method as recited in claim 7, wherein determining the composite adjustment of the power levels of the first set of channels and the corresponding pilot channel comprises:
   for each channel in the first set,
      determining whether data received on the channel contains errors,
      if the data received on the channel contains errors, determining a corresponding incremental power level adjustment, and
      if the data received on the channel does not contain errors, determining a corresponding decremental power level adjustment; and
   computing the composite adjustment as a function of the incremental and decremental power level adjustments for the channels in the first set.

9. The method as recited in claim 8, wherein the function of the incremental and decremental power level adjustments for the channels in the first set comprises adding the maximum incremental power level adjustment and all of the decremental power level adjustments.

10. The method as recited in claim 8, wherein the function of the incremental and decremental power level adjustments for the channels in the first set comprises adding the maximum incremental power level adjustment to the minimum decremental power level adjustment.

11. The method as recited in claim 8, wherein the function of the incremental and decremental power level adjustments for the channels in the first set comprises adding the minimum incremental power level adjustment to the maximum decremental power level adjustment.

12. The method as recited in claim 8, wherein the function of the incremental and decremental power level adjustments is constrained to a limited number of quantized levels.

13. The method as recited in claim 1, wherein adjusting the one or more T/P ratios for the one or more additional traffic channels comprises, for each additional traffic channel,
   determining whether data received on the channel contains errors,
   if the data received on the channel contains errors, incrementing the T/P ratio for the channel, and
   if the data received on the channel does not contain errors, decrementing the T/P ratio for the channel.

14. The method as recited in claim 13, wherein determining whether the data received on the channel contains errors and incrementing or decrementing the T/P ratio for the channel is performed by the base station, wherein the method further comprises the base station sending a message to the mobile station indicating the T/P ratio for the channel.

15. The method as recited in claim 14, further comprising the mobile station receiving the message and selecting transmission characteristics for the channel in accordance with the T/P ratio for the channel.

16. A system for controlling power in a wireless communication system having multiple reverse-link communication channels, comprising:
   a base station; and
   a mobile station coupled to the base station via a wireless communication link;
   wherein the base station is configured to receive data from the mobile station on a plurality of reverse-link channels on the wireless communication link; and
   wherein the base station is configured to adjust a power level for a first set of reverse-link channels including at least one traffic channel and a power level for a pilot channel according to a fixed ratio, and to separately adjust a traffic-to-pilot (T/P) ratio for each of one or more additional reverse-link traffic channels.

17. The system as recited in claim 16, wherein the base station is configured to adjust the power levels for the first set of reverse-link channels and the pilot channel to maintain the fixed ratio of the power level for the first set of reverse-link channels to the power level of the pilot channel.

18. The system as recited in claim 16, wherein the first set of reverse-link channels comprises a single reverse-link channel, and wherein the base station is configured to determine whether data received on the single reverse-link channel contains errors, and if the data received on the single reverse-link channel contains errors, to cause the power levels of the single reverse-link channel and the pilot channel to be incremented, and if the data received on the single reverse-link channel does not contain errors, to cause the power levels of the single reverse-link channel and the pilot channel to be decremented.

19. The system as recited in claim 18, wherein the base station is configured to cause the power levels of the single reverse-link channel and the pilot channel to be incremented or decremented by sending corresponding messages to the mobile station.

20. The system as recited in claim 19, wherein the mobile station is configured to increment or decrement the power levels of the single reverse-link channel and the pilot channel in accordance with the messages.

21. The system as recited in claim 16, wherein the first set of channels comprises multiple channels, wherein the base station is configured to adjust the power levels of the first set of channels and the corresponding pilot channel by determining for each channel in the first set whether data received on the channel contains errors and determining a composite adjustment of the power levels of the first set of channels and the corresponding pilot channel based on errors received on the multiple channels.

22. The system as recited in claim 21, wherein the base station is configured to determine the composite adjustment of the power levels of the first set of channels and the corresponding pilot channel by:
for each channel in the first set,
determining whether data received on the channel contains errors,
if the data received on the channel contains errors, determining a corresponding incremental power level adjustment, and
if the data received on the channel does not contain errors, determining a corresponding decremental power level adjustment; and
computing the composite adjustment as a function of the incremental and decremental power level adjustments for the channels in the first set.

23. The system as recited in claim 22, wherein the function of the incremental and decremental power level adjustments for the channels in the first set comprises adding the maximum incremental power level adjustment and all of the decremental power level adjustments.

24. The system as recited in claim 22, wherein the function of the incremental and decremental power level adjustments for the channels in the first set comprises adding the maximum incremental power level adjustment to the minimum decremental power level adjustment.

25. The system as recited in claim 22, wherein the function of the incremental and decremental power level adjustments for the channels in the first set comprises adding the minimum incremental power level adjustment to the maximum decremental power level adjustment.

26. The system as recited in claim 22, wherein the function of the incremental and decremental power level adjustments is constrained to a limited number of quantized levels.

27. The system as recited in claim 16, wherein the base station is configured to determine whether data received on each additional reverse-link traffic channel contains errors, and if the data received on the additional reverse-link traffic channel contains errors, to increment the T/P ratio of the additional reverse-link traffic channel, and if the data received on the additional reverse-link traffic channel does not contain errors, to decrement the T/P ratio of the additional reverse-link traffic channel.

28. The system as recited in claim 27, wherein the base station is configured to send messages indicating the incremented or decremented T/P ratio of the additional reverse-link traffic channel to the mobile station.

29. The system as recited in claim 28, wherein the mobile station is configured to set a power level of the additional reverse-link traffic channel in accordance with the messages.

30. A base station operable to communicate with a mobile station via a wireless communication channel, wherein the base station comprises:
a processing subsystem; and
a transceiver subsystem coupled to the processing subsystem;
wherein the transceiver subsystem is configured to receive signals on a first set of reverse-link channels including at least one traffic channel, a pilot channel, and one or more additional reverse-link traffic channels; and
wherein the processing subsystem is configured to adjust a power level for the first set of reverse-link channels and a power level for the pilot channel according to a fixed ratio, and to separately adjust a traffic-to-pilot (T/P) ratio for each of the one or more additional reverse-link traffic channels.

31. The base station as recited in claim 30, wherein the first set of reverse-link channels comprises a single reverse-link channel, wherein the processing subsystem is configured to adjust the power levels for the single reverse-link channel and the pilot channel to maintain the fixed ratio of the power level for the single reverse-link channel to the power level of the pilot channel.

32. The base station as recited in claim 31, wherein the processing subsystem is configured to determine whether data received on the single reverse-link channel contains errors, and if the data received on the single reverse-link channel contains errors, to cause the power levels of the single reverse-link channel and the pilot channel to be incremented, and if the data received on the single reverse-link channel does not contain errors, to cause the power levels of the single reverse-link channel and the pilot channel to be decremented.

33. The base station as recited in claim 31, wherein the processing subsystem is configured to cause the power levels of the single reverse-link channel and the pilot channel to be incremented or decremented by sending corresponding messages to a mobile station which is configured to increment or decrement the power levels of the single reverse-link channel and the pilot channel in accordance with the messages.

34. The base station as recited in claim 30, wherein the first set of channels comprises multiple channels, wherein the processing subsystem is configured to adjust the power levels of the first set of channels and the corresponding pilot channel by determining for each channel in the first set whether data received on the channel contains errors and determining a composite adjustment of the power levels of the first set of channels and the corresponding pilot channel based on errors received on the multiple channels.

35. The base station as recited in claim 34, wherein the processing subsystem is configured to determine the composite adjustment of the power levels of the first set of channels and the corresponding pilot channel by:
for each channel in the first set,
determining whether data received on the channel contains errors,
if the data received on the channel contains errors, determining a corresponding incremental power level adjustment, and
if the data received on the channel does not contain errors, determining a corresponding decremental power level adjustment; and
computing the composite adjustment as a function of the incremental and decremental power level adjustments for the channels in the first set.

36. The base station as recited in claim 35, wherein the function of the incremental and decremental power level adjustments for the channels in the first set comprises adding the maximum incremental power level adjustment and all of the decremental power level adjustments.

37. The base station as recited in claim 35, wherein the function of the incremental and decremental power level adjustments for the channels in the first set comprises adding the maximum incremental power level adjustment to the minimum decremental power level adjustment.

38. The base station as recited in claim 35, wherein the function of the incremental and decremental power level adjustments for the channels in the first set comprises adding the minimum incremental power level adjustment to the maximum decremental power level adjustment.

39. The base station as recited in claim 35, wherein the function of the incremental and decremental power level adjustments is constrained to a limited number of quantized levels.

40. The base station as recited in claim 30, wherein the processing subsystem is configured to determine whether data received on each additional reverse-link traffic channel contains errors, and if the data received on the additional reverse-link traffic channel contains errors, to increment the T/P ratio of the additional reverse-link traffic channel, and if the data received on the additional reverse-link traffic channel does not contain errors, to decrement the T/P ratio of the additional reverse-link traffic channel.

41. The base station as recited in claim 30, wherein the processing subsystem is configured to send messages indicating the incremented or decremented T/P ratio of the additional reverse-link traffic channel to a mobile station which is configured to set a power level of the additional reverse-link traffic channel in accordance with the messages.

* * * * *

UNITED STATES PATENT AND TRADEMARK OFFICE
CERTIFICATE OF CORRECTION

PATENT NO. : 7,505,780 B2
APPLICATION NO. : 10/628950
DATED : March 17, 2009
INVENTOR(S) : Wei et al.

Page 1 of 1

It is certified that error appears in the above-identified patent and that said Letters Patent is hereby corrected as shown below:

Column 11, line 22, claim 3: "comprises" to read as --comprises:--

Column 11, line 46, claim 7: "comprises" to read as --comprises:--

Signed and Sealed this
Fourteenth Day of June, 2011

David J. Kappos
*Director of the United States Patent and Trademark Office*